United States Patent
Zhu et al.

(10) Patent No.: US 12,043,114 B2
(45) Date of Patent: Jul. 23, 2024

(54) ADVANCED DRIVER ASSISTANCE SYSTEM AND MANIPULATION ASSEMBLY THEREOF

(71) Applicant: Volkswagen Aktiengesellschaft, Wolfsburg (DE)

(72) Inventors: Duan Zhu, Beijing (CN); Mathieu Cherubini, Beijing (CN)

(73) Assignee: Volkswagen Aktiengesellschaft, Wolfsburg (DE)

(*) Notice: Subject to any disclaimer, the term of this patent is extended or adjusted under 35 U.S.C. 154(b) by 224 days.

(21) Appl. No.: 17/425,270

(22) PCT Filed: Jan. 22, 2020

(86) PCT No.: PCT/IB2020/000008
§ 371 (c)(1),
(2) Date: Jul. 22, 2021

(87) PCT Pub. No.: WO2020/165643
PCT Pub. Date: Aug. 20, 2020

(65) Prior Publication Data
US 2022/0126694 A1    Apr. 28, 2022

(30) Foreign Application Priority Data
Jan. 28, 2019  (CN) .......................... 201920146827.1

(51) Int. Cl.
*B60K 35/10*  (2024.01)
*B60K 28/06*  (2006.01)
(Continued)

(52) U.S. Cl.
CPC .............. *B60K 35/10* (2024.01); *B60K 28/06* (2013.01); *B60K 31/00* (2013.01); *B60Q 1/343* (2013.01);
(Continued)

(58) Field of Classification Search
CPC ........ B60K 37/06; B60K 28/06; B60K 31/00; B60K 2031/0091; B60K 2310/20;
(Continued)

(56) References Cited

FOREIGN PATENT DOCUMENTS

DE     102011101709 A1 *  11/2012  ............. B60K 28/06
DE     102011101709 A1     11/2012
(Continued)

OTHER PUBLICATIONS

PCT/IB2020/00008. International Search Report & Written Opinion (May 26, 2020).

*Primary Examiner* — Isaac G Smith
*Assistant Examiner* — Nikki Marie M Molina
(74) *Attorney, Agent, or Firm* — Peter Zura; LOZA & LOZA, LLP

(57) ABSTRACT

An advanced driver assistance system (ADAS) and a manipulation assembly thereof. The manipulation assembly is configured as a joystick independently arranged in a vertical direction as a whole, and internally includes, at least partially, a plurality of manipulation modules used for an ADAS. The ADAS includes a manipulation assembly, a sensor module configured to detect the states of a driver, a vehicle and/or other vehicles, and a control module configured to receive a manipulation signal sent by the manipulation assembly and sensor data detected by the sensor module, and perform a corresponding driver assistance control operation according to the manipulation signal and the sensor data. Such configurations can improve user manipulation experience and ensure manipulation safety.

20 Claims, 2 Drawing Sheets

(51) Int. Cl.
    *B60K 31/00*     (2006.01)
    *B60K 35/28*     (2024.01)
    *B60K 35/60*     (2024.01)
    *B60Q 1/34*     (2006.01)
    *B60W 30/14*     (2006.01)
    *B60W 30/16*     (2020.01)

(52) U.S. Cl.
    CPC .......... *B60W 30/146* (2013.01); *B60W 30/16* (2013.01); *B60K 2031/0091* (2013.01); *B60K 35/28* (2024.01); *B60K 35/60* (2024.01); *B60K 2310/20* (2013.01); *B60K 2360/126* (2024.01); *B60K 2360/135* (2024.01); *B60K 2360/175* (2024.01); *B60K 2360/179* (2024.01); *B60K 2360/774* (2024.01); *B60W 2540/229* (2020.02); *B60W 2754/30* (2020.02)

(58) Field of Classification Search
    CPC ........ B60K 2370/126; B60K 2370/135; B60K 2370/175; B60K 2370/179; B60K 2370/774; B60K 28/066; B60K 2370/12; B60Q 1/343; B60W 30/146; B60W 30/16; B60W 2540/229; B60W 2754/30; B60W 30/143
    See application file for complete search history.

(56)     References Cited

FOREIGN PATENT DOCUMENTS

| | | | |
|---|---|---|---|
| DE | 102012002303 A1 * | 8/2013 | ............ B60K 26/02 |
| DE | 102012002303 A1 | 8/2013 | |
| DE | 102014118957 A1 | 6/2016 | |
| DE | 102015204591 A1 | 9/2016 | |

* cited by examiner

ADVANCED DRIVER ASSISTANCE SYSTEM AND MANIPULATION ASSEMBLY THEREOF

CROSS REFERENCE TO RELATED APPLICATION

The present application claims priority to International Patent Application No. PCT/IB2020/000008 to Zhu, et al., filed Jan. 22, 2020, titled "Advanced Driver Assistance System and Manipulation Assembly Thereof", which claims priority to Chinese Patent Application no. 201920146827.1, to Zhu, et al., filed Jan. 28, 2019, the contents of each being incorporated by reference in their entirety herein.

FIELD

The present disclosure relates to a driver assistance system such as an advanced driver assistance system (ADAS) and a manipulation assembly thereof.

BACKGROUND

Vehicular automation technologies have been developed continuously and cars manufactured by many automobile manufacturers have begun to be equipped with Advanced Driver Assistance Systems (ADAS). ADAS is a product of active safety technology that employs various kinds of sensors installed in the vehicle to collect environmental data inside and outside for technological processing such as static and dynamic object identification, detection and tracking, thereby enabling the driver to be aware of the potential dangers in the shortest possible time for improved attention and safety. The manipulation assembly of an ADAS directly affects user experience.

In prior art design, an ADAS comprises a fatigue detection module, an auxiliary front vehicle tracking module, an auxiliary active lane merging module and other manipulation modules, and it allows a user to touch a push button on the steering wheel to activate fatigue detection. For such a design, while the steering wheel needs not be swayed, if the user has entered the adaptive cruise control (ACC) state for a long time, he/she still has to frequently lift up his/her hand to activate the push button on the top of the steering wheel, which disrupts the comfort of using ADAS.

Furthermore, in some designs of ADAS in vehicles produced by some automobile manufacturers, the activation mechanisms of some manipulation modules (e.g. fatigue detection module) are arranged on the steering wheel of the vehicle, and require the user to shake the steering wheel for fatigue detection and to operate various push buttons on the steering wheel to complete settings of ADAS functions. There are obvious hazards in this solution, especially the interaction by shaking the steering wheel to activate fatigue detection is likely to affect driving safety due to violent shaking. The gathering of too many push buttons on the steering wheel is prone to causing incorrect operation and even hinder a user's determination to try using ADAS.

It was discovered during study on automated driving L1-L3 users' ADAS experience that when a user is at L2 level of automated driving monitoring state (a state where lane keeping assistance (LKA) system and automatic follow/stop system are turned on, user's feet leave brake pedal and accelerator, user's hands may leave steering wheel but user keeps looking straight ahead), the systems still require the user to complete driving performance settings and fatigue detection activation on the steering wheel. From a user experience perspective, this interaction would bring great inconvenience.

SUMMARY

The present disclosure aims to overcome the deficiencies of prior art by providing an advanced driver assistance system (ADAS) and a manipulation assembly thereof capable of ensuring manipulation safety and improving user manipulation experience.

According to one embodiment, there is provided a manipulation assembly used for an advanced driver assistance system (ADAS), wherein the manipulation assembly is a joystick independently arranged in a vertical direction as a whole, and internally comprises, at least partially, a plurality of manipulation modules used for an ADAS.

According to one, the plurality of manipulation modules include: a speed limiting adjustment module configured to adjust the maximum speed limit of the vehicle in adaptive cruise control (ACC) mode; a lane merging indication module configured to send a lane merging indication signal for changing lanes; a vehicle-to-vehicle distance adjustment module configured to adjust the minimum distance between the driver's vehicle in adaptive cruise control (ACC) mode and the vehicle directly in front thereof; and a fatigue detection activation module configured to activate driver fatigue detection.

According to another embodiment, the speed limiting adjustment module includes a forward and backward movement induction mechanism connected to the bottom of the joystick and generating an induction signal corresponding to the forward push or backward push of the joystick; the speed limiting adjustment module is configured to generate a control signal for correspondingly increasing or reducing the maximum speed limit of the vehicle based on the induction signal.

According to yet another embodiment, the speed limiting adjustment module is further configured to generate a control signal causing the maximum speed limit of the vehicle to have a larger increase or decrease when the forward and backward movement induction mechanism senses that the forward push or backward push of the joystick is a long push; and to generate a control signal causing the maximum speed limit of the vehicle to have a smaller increase or decrease when the forward and backward movement induction mechanism senses that the forward push or backward push of the joystick is a short push.

According to yet another embodiment, the lane merging indication module includes a leftward and rightward induction mechanism connected to the bottom of the joystick and generating an induction signal corresponding to the leftward push or rightward push of the joystick; the lane merging indication module is configured to generate a control signal for correspondingly merging lane leftwards or rightwards at the right time based on the induction signal.

According to yet another embodiment, the vehicle-to-vehicle distance adjustment module includes a rotation induction mechanism configured to generate a control signal corresponding to the clockwise or anticlockwise movement of the joystick for correspondingly increasing or reducing the minimum distance between the driver's vehicle and the vehicle directly in front thereof.

According to yet another embodiment, the fatigue detection activation module includes a touch induction mechanism, and the fatigue detection activation module is configured to activate driver fatigue detection when the touch induction mechanism senses touch movement.

According to yet another embodiment, the touch induction mechanism is arranged on the top of the joystick.

According to yet another embodiment, the manipulation assembly is arranged along the central passage of the vehicle for convenient operation. The manipulation assembly can also be arranged along the central passage of the vehicle at a location immediately adjacent to the armrest.

According to yet another embodiment, there is provided an advanced driver assistance system (ADAS), comprising: the manipulation assembly according to any of the above embodiments; a sensor module configured to detect the states of a driver, a vehicle and/or other vehicles; and an ADAS control module configured to receive a manipulation signal sent by the manipulation assembly and sensor data detected by the sensor module, and perform a corresponding driver assistance control operation according to the manipulation signal and the sensor data.

According to some embodiments, by independently arranging the manipulation assembly as a joystick in a vertical direction as a whole, the advanced driver assistance system (ADAS) and the manipulation assembly thereof enable the user to conveniently manipulate a plurality of manipulation modules used for the ADAS, and can ensure manipulation safety and significantly improve user manipulation experience.

DETAILED DESCRIPTION

Figure 1:
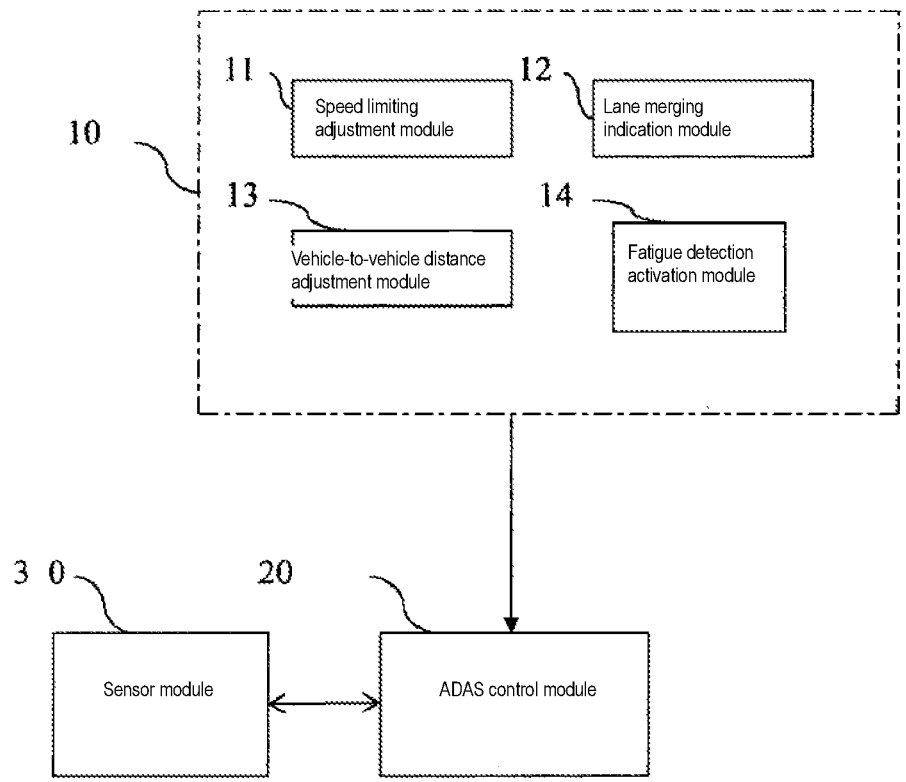
FIG. 1 is an illustrative block diagram of an advanced driver assistance system (ADAS) and a manipulation assembly thereof according to some aspects of the present disclosure.

FIG. 1 is a structural block diagram illustrating an advanced driver assistance system (ADAS) and a manipulation assembly thereof according to an embodiment of the present disclosure. As shown in FIG. 1, the ADAS may include a manipulation assembly 10, an ADAS control module 20 and a sensor module 30. The manipulation assembly 10 may include a speed limiting adjustment module 11, a lane merging indication module 12, a vehicle-to-vehicle distance adjustment module 13 and a fatigue detection activation module 14. The sensor module 30 may include a plurality of sensors, e.g., cameras, radar sensors, laser and ultrasonic sensors capable of detecting optical, thermal, pressure variables or other variables for monitoring the state of a vehicle (e.g., vehicle speed), and also capable of detecting the state of a driver, the distances from other vehicles, the speeds of other vehicles, etc. These sensors are usually located at the front and rear bumpers, side view mirrors, in the steering column or on the windscreen. The ADAS control module 20 is able to receive manipulation signals sent by the various modules and sensor data detected by the various sensors in the sensor module 30, and perform corresponding driver assistance control operations according to the manipulation signals and the sensor data, including controlling the vehicle speed limit, controlling leftward and rightward lane merging at the right time, adjusting the distance between the driver's vehicle and the vehicle directly in front thereof, and activating driver fatigue detection.

It will be understood by those skilled in the art that the manipulation assembly 10 may further comprise other manipulation modules used for the ADAS and requiring user intervention, and is not limited to the aforementioned four modules 11-14.

Figure 2:
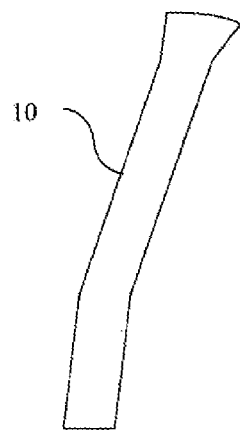
FIG. 2 is an illustrative outline diagram of a manipulation assembly used for an advanced driver assistance system (ADAS) according to some aspects of the present disclosure.

FIG. 2 is an outline diagram of a manipulation assembly 10 according to an embodiment of the present utility model. As shown in FIG. 2, the manipulation assembly 10 is a joystick independently arranged in a vertical direction as a whole, so that not only the ADAS is convenient to operate, other manipulating components of the vehicle (e.g., steering wheel) are not prone to accidental touches that result in incorrect operation. The joystick may include at least the forward and backward movement induction mechanism of the speed limiting adjustment module 11, the leftward and rightward induction mechanism of the lane merging indication module 12, the rotation induction mechanism of the vehicle-to-vehicle distance adjustment module 13, and the touch induction mechanism of the fatigue detection activation module 14. For example, the forward and backward movement induction mechanism of the speed limiting adjustment module 11 and the leftward and rightward induction mechanism of the lane merging indication module 12 can be arranged at the bottom of the joystick 10, the rotation induction mechanism of the vehicle-to-vehicle distance adjustment module 13 and the touch induction mechanism of the fatigue detection activation module 14 can be arranged at the upper portion or on the top of the joystick 10. The circuit parts (e.g., manipulation signal generation parts) of the speed limiting adjustment module 11, the lane merging indication module 12, the vehicle-to-vehicle distance adjustment module 13 and the fatigue detection activation module 14 can be arranged outside the joystick 10. When an induction mechanism senses a manipulation movement of the joystick 10, the corresponding circuit generates a corresponding manipulation signal and send it to the ADAS control module 20. The ADAS control module 20 will then perform a corresponding drive assistance control operation according to the manipulation signal received and the sensor data sent by the sensor module.

Figure 3:
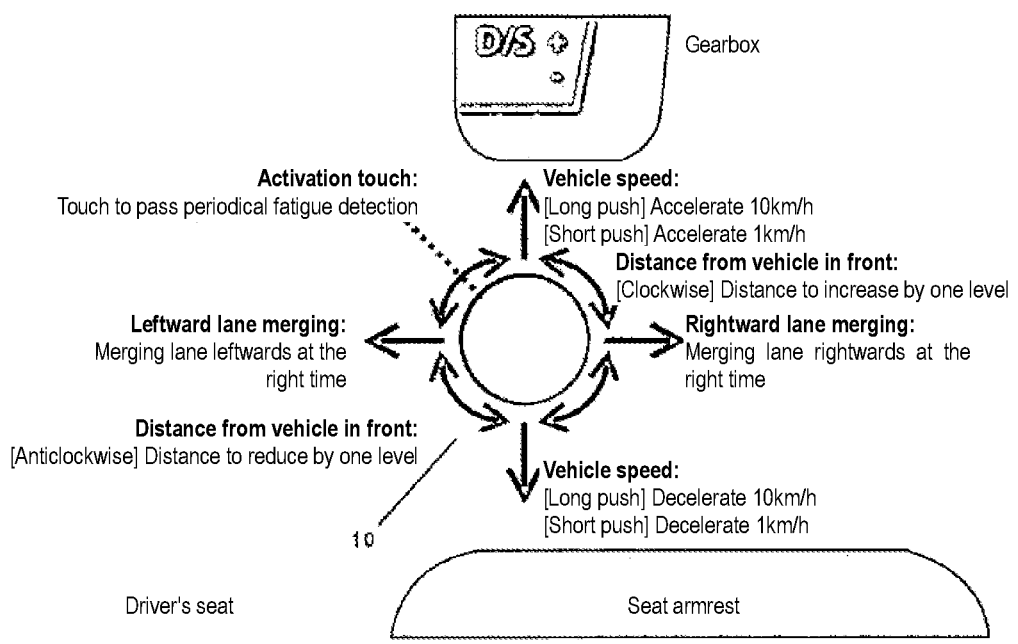
FIG. 3 is a top view of the manipulation assembly 10 shown in FIG. 2 according to some aspects of the present disclosure.

FIG. 3 is a top view of the manipulation assembly 10 shown in FIG. 2, i.e., the circular part at the center of the figure. The surrounding arrows and text descriptions illustrate the directions of user manipulation of the joystick and the corresponding manipulation functions; the smaller circle (indicated by dotted line) within the larger circle indicates a touch button used for activating fatigue detection. It can be seen that the manipulation assembly 10 can be located along the central passage of the vehicle for convenient operation, e.g., located between the vehicle gearbox (in the upper part of the figure) and the driver seat armrest (in the lower part of the figure), and this location is close to the front of the driver's right elbow rest. Preferably, the manipulation assembly 10 can be located along the central passage of the vehicle and close to the driver seat armrest for convenient operation. When the user turns on the ADAS mode (including: adaptive cruise control (ACC) and automatic lane keeping assistance (LKA)), the task of driving is handed over to the ADAS and the user's own task is switched to the monitoring state. In this monitoring state, the user will adjust the increase or decrease in the maximum speed limit for adaptive cruise control (ACC) by forward or backward push of the manipulation assembly 10 next to the right elbow rest;

indicate lane merging requirement to the ADAS by swaying the manipulation assembly 10 leftwards or rightwards, and ADAS will determine the optimal time for lane merging and control automatic lane merging operation according to the surrounding traffic conditions detected by the sensor module 30; control the minimum distance between the driver's vehicle in adaptive cruise control (ACC) mode and the vehicle directly in front thereof by rotating the manipulation assembly 10 clockwise or anticlockwise. In addition, the ADAS will regularly perform fatigue detection of the user during automatic driving and the user only needs to gently touch the detection push button on the top of the manipulation assembly 10 (as indicated by the dotted line in FIG. 3) to activate and perform driver fatigue detection.

By studying the state of users after the turning on of ADAS, especially when driving at high speeds, it was discovered that they would naturally enter a more relaxed state. Their hands would naturally leave the steering wheel, their feet would leave the accelerator or brake pedal, their arms would rest on the armrest, and this is relatively inconvenient for interacting with the front operation area again. In an embodiment of the present utility model, to address changes in user state, ADAS manipulation function modules are integrated in the joystick and arranged in an area that can be readily touched by the right hand, so that the user can effectively manipulate the vehicle autopilot state while being in a relaxed state. For example, by simply performing forward push and backward push of the joystick (as indicated by the upward and downward arrows in FIG. 3 respectively), leftward push and rightward push of the joystick (as indicated by the leftward and rightward arrows in FIG. 3 respectively), clockwise or anticlockwise rotation of the joystick (as indicated by the circular arrows in FIG. 3), the maximum speed limit, the distance between the driver's vehicle and the vehicle directly in front thereof, lane merging, etc can be changed. Thus, human and system/machine interaction can be optimized so that comfortable experience is brought for ADAS users on long-haul driving.

To enable user to rapidly adjust the maximum vehicle speed to a desired limit, the speed limiting adjustment module 11 may be further configured to generate a control signal for the maximum speed limit to increase or reduce by 10 km/h when the forward and backward movement induction mechanism senses that the forward push or backward push of the joystick 10 is a long push; and to generate a control signal for the maximum speed limit to increase or reduce by 1 km/h when the forward and backward movement induction mechanism senses that the forward push or backward push of the joystick 10 is a short push.

The vehicle-to-vehicle distance adjustment module may be configured to generate a control signal for the minimum distance between the driver's vehicle and the vehicle directly in front thereof to be increased by one level (e.g. one level may be set as 2 m or 5 m) when the rotation induction mechanism therein senses that the joystick 10 is rotated clockwise once; and to generate a control signal for the minimum distance between the driver's vehicle and the vehicle directly in front thereof to be reduced by one level when the rotation induction mechanism therein senses that the joystick 10 is rotated anticlockwise once. By rotating the joystick 10 an appropriate number of times based on vehicle speed, road condition or weather, for example, the user can control the minimum distance between the his/her vehicle and the vehicle directly in front thereof within an appropriate range.

The foregoing describes preferred embodiments of the present disclosure, which are illustrative and non-limiting. It will be understood by those skilled in the art that the said embodiments may be altered and adjusted without departing from the spirit of the present utility model. The scope of protection of the present utility model shall be defined by the appended claims.

What is claimed is:

1. A control assembly for an advanced driving assistant system (ADAS) of a car, comprising:
   an ADAS control module;
   a manipulation assembly, communicatively coupled to the ADAS control module, the manipulation assembly being configured to extend independently in a vertical direction from an interior surface of the car, the manipulation assembly comprising
   a plurality of sensing mechanisms for sensing levered movement of the manipulation assembly,
   a rotation sensing mechanism for sensing rotational movement of the manipulation assembly,
   a plurality of control modules for controlling the ADAS, wherein the plurality of control modules comprise:
   a speed limit adjustment module, configured to adjust a maximum speed limit for the ADAS control module based on a first levered movement;
   a lane change indication module, configured to send a lane change indication for the ADAS control module based on a second levered movement; and
   a vehicle distance adjustment module, configured to adjust a minimum distance to another car in front of the car during activation of the ADAS control module using the rotation sensing mechanism, wherein the vehicle distance adjustment module is configured to transmit control signals for increasing or decreasing the minimum distance to the another car in front of the car in accordance with a clockwise or anti-clockwise rotation of the manipulation assembly.

2. The control assembly according to claim 1, wherein the plurality of sensing mechanisms comprises a forward and backward movement sensing mechanism coupled to a bottom of the lever, and wherein the speed limit adjustment module is configured to generate sensing signals corresponding to forward and backward push actions of the manipulation assembly.

3. The control assembly according to claim 2, wherein the speed limit adjustment module is configured to generate control signals for increasing or decreasing the maximum speed limit in accordance with the generated sensing signals.

4. The control assembly according to claim 2, wherein the speed limit adjustment module is further configured to generate control signals for increasing or decreasing the vehicle maximum speed limit by a first configured amount when the forward and backward movement sensing mechanism senses forward and backward push actions of the manipulation assembly lasting for a first configured time period.

5. The control assembly according to claim 4,
   wherein the speed limit adjustment module is further configured to generate control signals for increasing or decreasing the vehicle maximum speed limit by a second configured amount when the forward and backward movement sensing mechanism senses forward and backward push actions of the manipulation assembly lasting for a second configured time period, and wherein the second configured amount is shorter than the first configured amount, and the second configured time period is shorter than the first configured time period.

6. The control assembly according to claim 1, wherein the plurality of sensing mechanisms comprise a leftward and rightward movement sensing mechanism that is coupled with a bottom of the manipulation assembly and generates sensing signals corresponding to leftward and rightward push actions of the manipulation assembly and wherein the lane change indication module is configured to generate control signals for a lane change toward the left lane or the right lane at a configured time in accordance with the sensing signals.

7. The control assembly according to claim 1, wherein the plurality of control modules comprise a fatigue detection activation module, configured to activate fatigue detection for a driver of the car, wherein the fatigue detection activation module comprises a touch sensing mechanism, configured to activate the fatigue detection when the touch sensing mechanism detects a touch action.

8. The control assembly according to claim 7, wherein the touch sensing mechanism is configured on the manipulation assembly.

9. The control assembly according to claim 1, wherein the manipulation assembly is configured on a central console of the car.

10. The control assembly according to claim 9, wherein the manipulation assembly is configured at a position proximate to an armrest on the central console of the car.

11. A method for configuring a control assembly for an advanced driving assistant system (ADAS) of a car, comprising:
configuring a manipulation assembly, communicatively coupled to an ADAS control module, to extend independently in a vertical direction from an interior surface of the car, the manipulation assembly comprising a plurality of sensing mechanisms for sensing levered movement of the manipulation assembly, and a rotation sensing mechanism for sensing rotational movement of the manipulation assembly,
configuring a plurality of control modules of the manipulation assembly for controlling the ADAS, wherein configuring the plurality of control modules comprises configuring a speed limit adjustment module to adjust a maximum speed limit at a state of adaptive cruise of the car for the ADAS control module based on a first levered movement;
configuring a lane change indication module to send a lane change indication for the ADAS control module based on a second levered movement; and
configuring a vehicle distance adjustment module to adjust a minimum distance to another car in front of the car during activation of the ADAS control module using the rotation sensing mechanism, wherein the vehicle distance adjustment module is configured to transmit control signals for increasing or decreasing the minimum distance to the another car in front of the car in accordance with a clockwise or anticlockwise rotation of the manipulation assembly.

12. The method according to claim 11, wherein the plurality of sensing mechanisms comprises a forward and backward movement sensing mechanism coupled to a bottom of the lever, and further comprising configuring the speed limit adjustment module to generate sensing signals corresponding to forward and backward push actions of the manipulation assembly.

13. The method according to claim 12, further comprising configuring the speed limit adjustment module to generate control signals for increasing or decreasing the maximum speed limit in accordance with the generated sensing signals.

14. The method according to claim 12, further comprising configuring the speed limit adjustment module to generate control signals for increasing or decreasing the vehicle maximum speed limit by a first configured amount when the forward and backward movement sensing mechanism senses forward and backward push actions of the manipulation assembly lasting for a first configured time period.

15. The method according to claim 14, further comprising configuring the speed limit adjustment module to generate control signals for increasing or decreasing the vehicle maximum speed limit by a second configured amount when the forward and backward movement sensing mechanism senses forward and backward push actions of the manipulation assembly lasting for a second configured time period,
and wherein the second configured amount is shorter than the first configured amount, and the second configured time period is shorter than the first configured time period.

16. The method according to claim 11, wherein the plurality of sensing mechanisms comprise a leftward and rightward movement sensing mechanism that is coupled with a bottom of the manipulation assembly and generates sensing signals corresponding to leftward and rightward push actions of the manipulation assembly and wherein configuring the lane change indication module comprises configuring the lane change indication module to generate control signals for a lane change toward the left lane or the right lane at a configured time in accordance with the sensing signals.

17. The method according to claim 11, wherein configuring the plurality of control modules comprises configuring a fatigue detection activation module to activate fatigue detection for a driver of the car, and wherein configuring the fatigue detection activation module comprises configuring the fatigue detection activation module with a touch sensing mechanism, operable to activate the fatigue detection when the touch sensing mechanism detects a touch action.

18. The method according to claim 17, wherein the touch sensing mechanism is configured on the manipulation assembly.

19. The method according to claim 11, wherein configuring the manipulation assembly comprises configuring the manipulation assembly to be located on a central console of the car.

20. A control assembly for an advanced driving assistant system (ADAS) of a car, comprising:
an ADAS control module;
a manipulation assembly, communicatively coupled to the ADAS control module, the manipulation assembly being configured to extend independently in a vertical direction from an interior surface of the car, the manipulation assembly comprising
a plurality of sensing mechanisms for sensing levered movement of the manipulation assembly,
a rotation sensing mechanism for sensing rotational movement of the manipulation assembly,
a plurality of control modules for controlling the ADAS, wherein the plurality of control modules comprise:
a speed limit adjustment module, configured to adjust a maximum speed limit for the ADAS control module based on a first levered movement comprising a forward and backward push actions of the manipulation assembly sensed by at least one of the plurality of sensing mechanisms;

a lane change indication module, configured to send a lane change indication for the ADAS control module based on a second levered movement; and a vehicle distance adjustment module, configured to adjust a minimum distance to another car in front of the car during activation of the ADAS control module using the rotation sensing mechanism, wherein the vehicle distance adjustment module is configured to generate control signals for increasing or decreasing the minimum distance to the another car in front of the car in accordance with a clockwise or anti-clockwise rotation of the manipulation assembly.

* * * * *